Oct. 12, 1965 P. BARKAN ETAL 3,211,886
ARC-CLEANING AND ARC-PLASMA GENERATING APPARATUS
Filed May 6, 1963 3 Sheets-Sheet 1
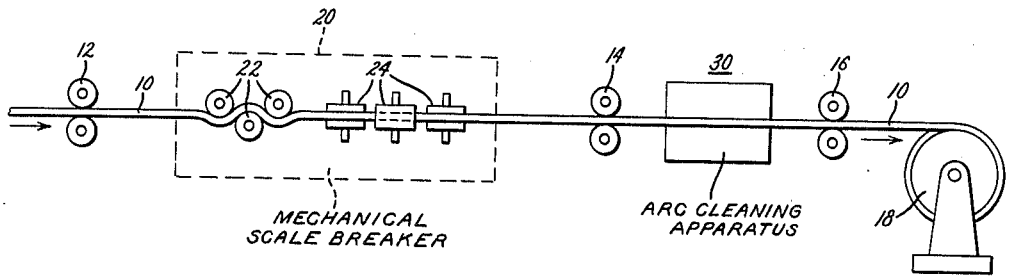
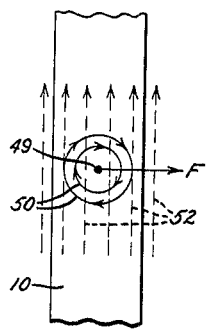
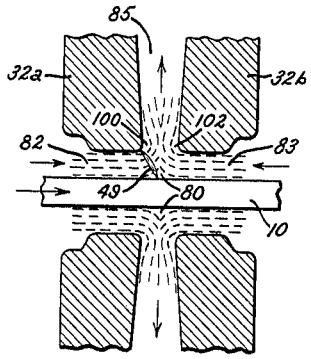
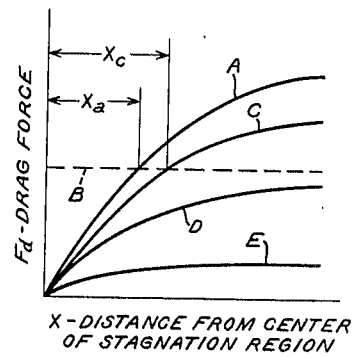
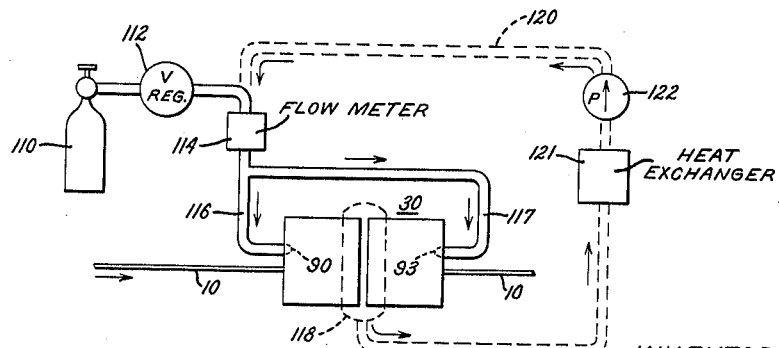
INVENTORS:
PHILIP BARKAN,
THOMAS H. LEE,
JOSEPH W. PORTER,
BY William Freedman
ATTORNEY.

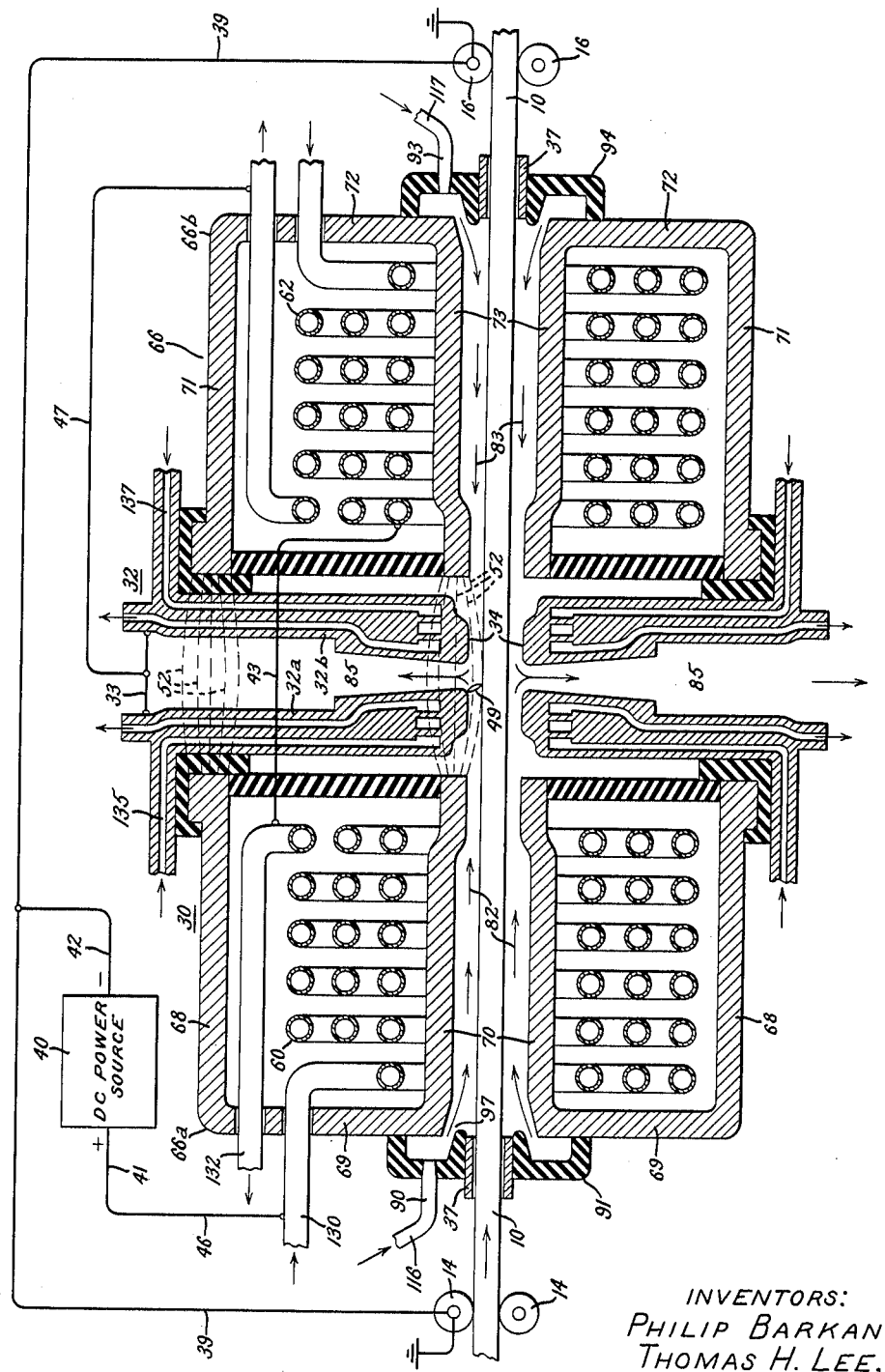

Oct. 12, 1965 P. BARKAN ETAL 3,211,886
ARC-CLEANING AND ARC-PLASMA GENERATING APPARATUS
Filed May 6, 1963 3 Sheets-Sheet 3
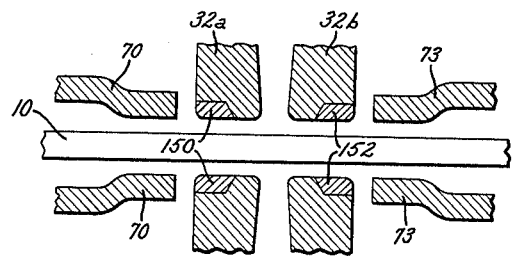
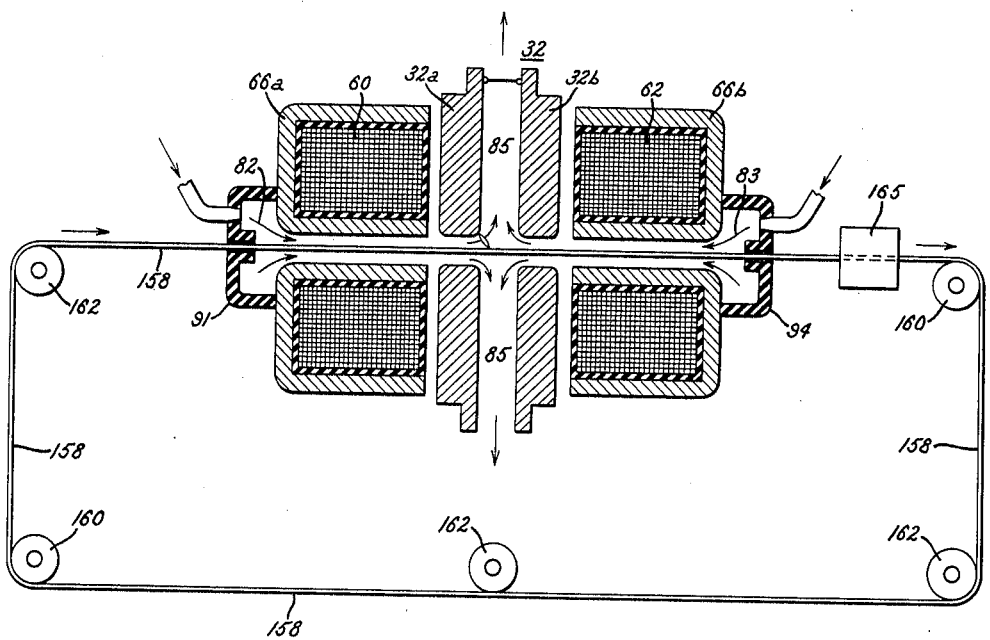
INVENTORS:
PHILIP BARKAN,
THOMAS H. LEE,
JOSEPH W. PORTER,
BY William Freedman
ATTORNEY.

United States Patent Office 3,211,886
Patented Oct. 12, 1965

3,211,886
ARC-CLEANING AND ARC-PLASMA
GENERATING APPARATUS
Philip Barkan, Lima, Thomas H. Lee, Nether Providence, and Joseph W. Porter, Media, Pa., assignors to General Electric Company, a corporation of New York
Filed May 6, 1963, Ser. No. 278,254
21 Claims. (Cl. 219—123)

This invention relates to arc-utilization apparatus that (1) can be used for cleaning the surface of conductive stock by means of an electric arc that acts to remove scale and other contaminants from the surface of the stock or (2) can be used as a generator of high temperature arc plasma.

With regard to arc-cleaning, the invention is particularly concerned with arc-cleaning apparatus of the type that comprises a stationary annular anode having a bore through which the stock is passed in spaced-apart relationship to the anode. Between this anode and the moving stock an arc is established; and this arc is rotated about the periphery of the stock. The stock serves as a cathode for the arc, and the surface of the stock is cleaned by an arc-eroding action that appears to be attributable to positive ions bombarding the cathode at the cathode terminal of the arc.

Prior arc-cleaning apparatus of this general type has not been entirely satisfactory because the arc has been quite erratic in cleaning the stock, particularly where the stock has been of a magnetic material such as iron or steel. In this regard, the cathode terminal of the arc has exhibited a strong tendency to stick to axially-restricted sections of the moving stock as it passes through the anode and also to jump in large discrete steps axially of the stock. This has resulted in heavily burned areas where the arc cathode has stuck to the stock and in poorly cleaned surfaces in the areas jumped by the arc cathode. This excessive burning of the stock in axially-restricted sections is referred to hereinafter as "ringing," and the jumping of the arc cathode over areas of the stock without adequately cleaning them is referred to hereinafter as "skipping."

An object of the present invention is to provide arc-cleaning apparatus that is capable of uniformly cleaning the stock passed therethrough with a minimum of such ringing and skipping, even when the stock is of a magnetic material.

This tendency for skipping to occur increases as the speed of the stock increases. Another object of our invention is to achieve the above-described uniform cleaning of the stock even for very high stock speeds, e.g. in excess of 100 feet per minute.

Another object is to construct the arc-cleaning apparatus in such a manner that a magnetic field of high intensity, properly oriented with respect to the arc to produce arc-rotation about the stock, can readily be obtained.

Another object is to assure that the arc is sustained despite abrupt increases in arc voltage such as might result from the arc cathode encountering an unusually heavy spot of scale on the stock.

In carrying out our invention in one form, we provide apparatus for cleaning the surface of elongated conductive stock by means of an electric arc comprising an annular anode having a bore through which the elongated stock is passed. Communicating with this bore and leading radially outward therefrom is an exhaust passage, the entrance to which is located intermediate the longitudinally opposed ends of the anode. The portions of the anode at opposite sides of the exhaust passage are electrically connected together independently of the arc. Means is provided for forcing a first stream of gas to flow longitudinally of the bore in one direction and then through said exhaust passage and for concurrently forcing a second stream of gas to flow longitudinally of the bore in an opposite direction and then through the exhaust passage. The two streams merge at the entrance to the exhaust passage to form an annular stagnation zone about the periphery of the stock adjacent said entrance. The arc is established between the anode and the stock with the cathode terminal of the arc located in this annular stagnation zone. Magnetic means is provided for rotating the arc about the periphery of the elongated stock as the stock passes through the anode.

The apparatus further comprises means independent of the arc for maintaining the flow rate through said streams high enough to hold the cathode terminal of the arc in said stagnation zone despite the passage of scaly stock of magnetic material through said apparatus at over 100 feet per minute.

In a preferred form of our invention, the magnetic means comprises means for producing a magnetic field that extends axially of the bore across the entrance to the exhaust passage. A magnetic circuit for this magnetic field is defined in part by two generally annular members of magnetic material surrounding the axis of the anode bore and located at spaced apart positions on opposite sides of the exhaust passage. The magnetic circuit is so constructed that these annular members are in series in the magnetic circuit and the space between the annular members constitutes an annular gap in series with the annular members across which the magnetic field extends axially of the anode bore.

As mentioned hereinabove, we are also concerned with arc-utilization apparatus that can be used as a generator of high temperature arc plasma. In our particular case, we are concerned with a plasma generator that is capable of producing large volumes of highly and uniformly heated ionized gases. To enable the arc to heat and ionize large volumes of gas, the power input into the arc must be relatively high. This high power input tends to shorten the electrode life because the higher this power input, the higher the rate of arc-erosion at the cathode.

Another object of our invention is to provide an arc plasma generator than can operate for long periods of time to produce large volumes of ionized gas, yet without excessive arc-erosion at the electrodes.

In attaining this object, we use anode and arc-rotating structure similar to that described hereinabove for the arc cleaning apparatus. However, the cathode is constituted by a clean metallic rod that is driven through the anode bore in such a manner that longitudinally-displaced sections of the rod move repetitively through the arcing region. The rod is driven at high speed so that any given section of the rod is exposed to the arc for only a very short time. By limiting this exposure, we can limit arc-erosition of the cathode to a permissibly low level.

To effect uniform heating of the gases passing through the plasma generator, it is important that the arc be maintained in an axially fixed position despite the high speed motion of the cathodic rod. We maintain this arc position fixed by causing the gas flow to create a fixed stagnation region about the rod periphery in which the arc cathode is captured. The arc cathode remains in this fixed stagnation region despite the passage of the rod therethrough.

For a better understanding of our invention, reference may be had to the following description taken in conjunction with the accompanying drawings, wherein:

FIG. 1 is a schematic view of a descaling installation comprising arc-cleaning apparatus embodying one form of our invention.

FIG. 2 is an enlarged sectional view of the arc-cleaning apparatus schematically shown in FIG. 1.

FIG. 3 is a diagrammatic view of certain magnetic relationships responsible for rotation of the arc about the conductive stock.

FIG. 4 is an enlarged view of a portion of FIG. 2 illustrating certain fluid flow relationships.

FIG. 5 is a graphical representation of certain force relationships present in the apparatus of FIG. 2.

FIG. 6 is a schematic showing of the system for handling the gas that is circulated through the arc-cleaning apparatus of FIG. 2.

FIG. 7 illustrates a modification of the apparatus shown in FIG. 2.

FIG. 8 is a schematic illustration of a plasma generator embodying one form of our invention.

Referring now to FIG. 1, there is shown a rod 10, in the form of wire stock, the surface of which it is desired to clean. In a typical application of the invention, the wire stock initially has a surface scale thereon one or two mils in thickness. For wire stock of steel or iron this scale typically is an iron oxide.

The wire stock is supported by conductive rollers 12, 14 and 16 located at spaced-apart locations along the length of the wire stock. The stock moves to the right and is wound up on a drum 18, which is driven by a motor, not shown. The arrangement for moving the stock may be of any suitable conventional type, and additional details are therefore not shown.

The first step in cleaning the rod is to pass it through a mechanical scale breaker 20 that acts to remove a large portion of the initial scale by mechanically breaking it. This mechanical scale breaker can be of any conventional form but preferably comprises a first series of rollers 22 that are disposed in a vertical plane and a second series of rollers 24 that are disposed in a horizontal plane. The rollers of each series have overlapping peripheries that act to deform the rod and then straighten it as it passes therethrough. This action breaks up a large portion of the scale on the rod surface. Rollers 22 act to deform the rod in one plane and rollers 24 in a plane perpendicular to the first plane. A great number of rollers may be provided in each series if needed to perform the desired operation.

Most of the scale broken from the stock by the mechanical scale breaker 20 falls off the stock or is blown or wiped off, but closely-spaced patches of scale, tenaciously adhering to the stock, remain. The mechanical scale breaker 20 is not capable of removing most of this remaining scale. This remaining scale is removed by means of the arc-cleaning apparatus diagrammatically shown at 30 in FIG. 1. This arc-cleaning apparatus is shown in greater detail in FIG. 2.

Referring now to FIG. 2, the arc-cleaning apparatus 30 comprises a stationary annular anode 32 comprising two collinear annular sections 32a and 32b that are spaced apart longitudinally of the wire stock. These anode sections are electrically connected together by means of a conductor shown schematically at 33. The annular anode 32 has a centrally located bore 34 through which the stock passes to the right at high speed. The wire stock is suitably supported by the rollers 14 and 16 and by suitable guide sleeves 37 at opposite ends of the arc-cleaning apparatus so that it is maintained radially spaced from the annular anode 32 about the entire inner periphery of the bore 34.

The anode 32 is connected to the positive terminal 41 of a direct current power source 40, and the wire stock 10 is connected to the negative terminal 42 of the power source. In the illustrated embodiment, the connection between the wire stock and the negative terminal of the power source is made through the conductive rollers 14 and 16 at both sides of the arc-cleaning apparatus and conductors 39 extending between the rollers and the negative terminal. The connection between the positive terminal 41 of the power source and the anode 32 is preferably through a pair of low resistance coils 60 and 62, which are connected in series with each other between the positive terminal 41 and the anode 32. The structure and function of the coils 60 and 62 will be explained in greater detail hereinafter. For the present, it is sufficient merely to note that the coils 60 and 62 are connected in series with each other by means of a schematically illustrated conductor 43 which extends between them; and this series combination of the coils 60 and 62 is connected at one electrical end to the positive terminal 41 by means of a conductor 46 and is connected at its other electrical end to the anode structure 32 by means of a conductor 47. As was pointed out hereinabove, the two sections 32a and 32b of the anode 32 are electrically connected together by a conductive connection 33. When there is no arc between the anode 32 and the wire stock 10, the anode and the stock are electrically isolated from each other.

After certain preliminary steps, soon to be described, the arc-cleaning operation is begun by establishing an arc, such as shown at 49, between the anode 32 and the wire stock 10. This can be done in any suitable manner, as by temporarily applying a high voltage between the anode and the wire stock or by temporarily connecting these parts together electrically and then breaking the connection in the preferred arcing region. Since suitable arc-initiating schemes are known and form no part of our present invention, none has been illustrated in the drawing. An electric arc is capable of removing from the surface of the wire stock any scale that its cathode terminal comes into contact with, assuming that the arcing current is at a reasonably high value, e.g., above 500 amperes, and assuming further that some of the heavy continuous scale initially present has first been removed as by the mechanical scale-breaker 20. Since the entire periphery of the wire stock must be cleaned, it is important that this cathode terminal of the arc move in a circumferential direction about the periphery. It is also important that this circumferential motion take place at high speed so as to assure complete coverage during the limited period that any given section of the fast moving wire stock is in the arcing region.

For effecting this high speed revolution of the arc about the periphery of the wire stock, we create an intense magnetic field that extends through the arcing region in a direction longitudinally of the wire stock. Otherwise stated, this magnetic field is in a direction longitudinally of the longitudinal axis of the anode bore. This axial magnetic field reacts with the field about the radially-extending arc to provide a circumferentially-acting force that drives the arc at high speed about the periphery of the stock. This action can be better understood by referring to FIG. 3, where the magnetic field about the arc 49 is represented by the arrows 50 surrounding the arc, and the axial magnetic field is represented by the dotted line arrows 52. The lines of force of the two fields in the region to the right of the arc 49 are in opposite directions, thus canceling each other; whereas the lines of force to the left of the arc are in the same direction, thus reinforcing each other. Thus, the portion of the magnetic field on the left of the arc is stronger than the portion on the right, and an unbalanced force F is therefore present that moves the arc to the right toward the weaker portion of the magnetic field. This motion to the left corresponds to motion about the periphery of the wire stock 10, or, in other words, arc-rotation.

For creating this magnetic field 52, we rely upon the previously mentioned pair of coils 60 and 62, which are connected in series with the anode 32 between the anode and the positive terminal 41 of the power source 40. Each of these coils, which will soon be described in greater detail, is of an annular shape and surrounds the wire stock 10. The assembly constituted by coils 60 and 62 is enveloped by a generally toroidal shell 66 of magnetic material that provides a magnetic circuit surrounding the coil assembly for most of the flux developed when the coils are energized. This generally toroidal shell 66 comprises two colinearly disposed annular sections 66a and 66b, each of which is of a U-shaped cross section, as viewed in FIG. 2. Each of these annular shell sections may be thought of as comprising an outer cylinder and an inner cylinder connected together by an end plate. For example, shell section 66a comprises an outer cylinder 68 and an inner cylinder 70 connected together by an end plate 69. The other shell section 66b comprises an outer cylinder 71 and an inner cylinder 73 connected together by an end plate 72. The two shell sections 66a and 66b are spaced apart along the length of the wire stock 10 so that there are two annular air gaps located in the magnetic circuit, one between the adjacent ends of the outer cylinders 68 and 71 and one between the adjacent ends of the inner cylinders 70 and 73. These annular air gaps are traversed by flux extending between the opposed faces of the cylinders on axially-opposed sides of the gaps, as has been indicated by the dotted lines 52 in FIG. 2. The anode 32 is disposed in these air gaps, but since the anode is of a non-magnetic material, such as copper, it has little effect on the flux traversing the gaps. The flux 52 traversing the gap between the inner cylinders 70 and 73 is in a direction axial of the wire stock 10 and may be thought of as enveloping the wire stock about its periphery. Since the arcing region is in this air gap, it too is traversed by the flux in a direction axial of the wire stock. As explained hereinabove, this axial magnetic field causes the arc to revolve at high speed about the wire periphery.

As mentioned hereinabove, prior arc-cleaning devices have not been entirely satisfactory because the arc has been quite erratic in cleaning the stock, particularly where the stock has been of a magnetic material. One factor responsible for this erratic coverage has been that the arc has not been rotated at a high enough speed to enable its cathode spot to adequately cover the entire surface of its stock. We have been able to obtain much higher arc-rotating speeds than heretofore obtained because our magnetic field is so oriented with respect to the arc as to be exceptionally efficient in producing arc-rotating force and also because this efficiently oriented field has a much higher intensity in the critical arcing regions than has heretofore been the case. With respect to the orientation of the field, it will be seen that the magnetic field 52 crosses the arcing region between the tubes 70 and 73 of magnetic material located at axially-spaced locations on axially-opposed sides of the arcing region. This is an ideal arrangement for the production of an axial magnetic field, which is the type that is best suited for rotation of a radially-extending arc. Since the arcing region is located in the air gap between the cylinders 70 and 73 of magnetic material, it is in a location where the density of the magnetic field is high, and it is thus possible to readily obtain the desired high field strength with moderate currents through the coils 60 and 62. A typical field strength that we have provided in the arcing region has been 3000 gausses.

Contributing to the desired high field strength in the arcing region is the small diameter of the cylinders 70 and 73 at their axially inner ends. By reducing this diameter, more spacing is provided between each of these inner cylinders and its corresponding outer cylinder 68 or 71. This greater radial spacing reduces the amount of leakage flux that flows directly between the inner and outer cylinders by a radial path bypassing the arcing gap. The fact that the outer cylinders 68 and 71 have a large diameter advantageously increases this radial spacing and also contributes to reduced reluctance to flux flowing between the two outer cylinders 68 and 71.

Another important factor that has been responsible for erratic coverage of the work surface by the arc is that, with magnetic materials, the arc has shown a strong tendency to stick to axially-restricted sections of the moving wire stock as it passes through the anode and also to jump in large discrete steps axially of the wire stock. The first of these actions, referred to hereinabove as "ringing" has resulted in heavily burned grooves extending around the periphery of the stock; and the second of these actions, referred to hereinabove as "skipping," has resulted in poor coverage of the areas skipped.

We have been able to minimize such ringing and skipping, by (1) forcing two streams of fluid through the arc-cleaning assembly in such a manner as to create an annular stagnation region about the periphery of the wire stock, and by (2) capturing the cathode terminal of the arc in the stagnation region to prevent the cathode terminal from sticking to the moving stock as it passes through the anode. This annular stagnation region is best shown in FIG. 4, where it is designated 80. The two streams that produce this stagnation region are shown at 82 and 83 in FIG. 4. These streams 82 and 83 are produced by forcing pressurized gas axially of the wire stock 10 from opposite ends of the arc cleaning assembly. These streams 82 and 83 flow through the bore of anode 32 in axially-opposed directions, merging in a location intermediate the ends of the anode, and then exhausting radially outward from the anode through a radially extending exhaust passage 85. This exhaust passage 85 is defined by the space provided between the two anode sections 32a and 32b. The stagnation region 80 is formed opposite the entrance to the exhaust passage 85 where the two streams merge.

If the arc terminal attempts to move to the right with the wire stock, it encounters an opposing force from the stream 83 which prevents it from leaving the stagnation region. This opposing force, which can be termed a drag force, $F_d$, varies as a direct function of $Adv^2$, where $d$ is the gas density, $A$ is the projected area of the arc that the stream acts against, and $v$ is the effective velocity of the stream measured in a direction axially of the wire stock in the immediate vicinity of the cathode arc terminal. Curve A of FIG. 5 illustrates the approximate manner in which this force $F_d$ varies at points displaced to the right from the center of the scavenging zone by distances $x$ plotted on the abscissa. For the curve A the flow rate through the stream 83, which is a function of $v^2$, is assumed to be a constant. The horizontal dotted line B represents the approximate force required to prevent the arc from sticking to the stock as it moves to the right. Where the curve A intersects the dotted line B, a condition of equilibrium exists, indicating that the arc will move downstream by a distance $X_a$ before this equilibrium condition is established. The curve C represents the drag force $F_d$ for a decreased flow rate, but a flow rate that is still high enough to prevent the arc from sticking to the stock after it has moved the greater distance $X_c$ at which curve C crosses the force line B. If the flow rate is further decreased so that the force $F_d$ varies in accordance with the curve D it will be apparent that the force $F_d$ will fail to reach a high enough value to prevent sticking of the cathode spot to the stock 10. Under these conditions, the arc will produce the previously described heavily-burned grooves about the rod periphery in the region where the cathode terminal is struck. In most cases the cathode terminal will finally skip back to a less advanced position on the stock after a certain amount of arc elongation, but, in doing so, will poorly clean the length of stock skipped over. Also, in some cases, where the force $F_d$ is low, the arc will be so elongated that it will be extinguished.

The minimum flow rate needed to essentially prevent this ringing and skipping action will depend upon numerous different factors, e.g., the condition of the rod surface, the type and density of gas used for streams 82 and 83, the effective area of the opening between the outer periphery of the stock and the bore of the anode, and the rate of rod travel; so it will therefore be apparent that it is not feasible to set forth this minimum flow rate with exactness or in terms of a precise mathematical expression. However, one of ordinary skill working with the illustrated arc-cleaning apparatus should have no difficulty adjusting this flow rate to a value which will prevent the above-described ringing and skipping actions. A flow rate that we have found to produce excellent cleaning action is 300–400 cubic feet per hour of nitrogen measured at standard temperature and pressure. This was the total flow through both streams 82 and 83 with approximately equal distribution between the streams, with rod speeds of 100 ft. per minute and higher, anode current of 700 amperes, a steel rod with an oxide scale, a rod diameter of 0.2 inch and an anode internal diameter of 0.7 inch.

Our tests have shown that the flow rate through the streams 82 and 83 can be widely unbalanced without interfering with the desired arc stabilization at the entrance to the exhaust passage 85. It is important, however, that the flow rate through the stream 83, which is in a direction counter to the direction of stock motion, be high enough to prevent the cathode terminal from sticking to the moving stock and moving therewith in the direction of stock motion. Assuming an adequate flow rate through the stream 83, the flow rate through the oppositely-directed stream 82 can be lowered to almost zero without seriously impairing the arc stability. The basic contribution of the stream 82 toward arc stabilization seems to be its role in creating the stagnation region by forcing the other stream 83 to exit through the exhaust passage 85 rather than continuing along the wire stock and out the opposite end of the assembly. Any appreciable amount of flow continuing along the stock past the entrance to the exhaust passage would essentially destroy the stagnation zone in which the arc terminal is captured.

The maximum flow rate must be held below a value that will cause the arc to be extinguished. In this regard, as the flow rate increases, the arc voltage increases. If the arc voltage becomes so high that it approaches the circuit voltage, the arc will be extinguished. We prefer to rely upon a flow rate far below the maximum value and just slightly above the minimum. This is desirable not only from the standpoint of gas economy but also to hold the arc voltage down, thereby reducing the amount of electrical energy expended in the arc-cleaning process.

The gas streams 82 and 83 are admitted to the space about the stock 10 through orifices provided at opposite ends of the arc-cleaning assembly. These orifices 90 for gas stream 82 are provided in an annular end plate 91 at the left hand end of the arc-cleaning assembly. These orifices 90 are circumferentially-spaced about the longitudinal axis of the annular end plate 91. Similar circumferentially-spaced orifices 93 are provided in a corresponding end plate 94 at the opposite end of the arc-cleaning assembly. The end plates are preferably of electrical insulating material so as to prevent them from constituting a short circuit path around the arc between the anode and the stock.

These end plates serve the additional important function of essentially blocking the flow of atmospheric air into and out of the arc-cleaning apparatus through the clearance space provided between the guide bearings 37 and the periphery of the wire stock 10. In this connection, the end plates are so constructed that the streams 82 and 83 enter the space immediately surrounding the wire stock via paths disposed at very small acute angles to the longitudinal axis of the wire stock. The momentum of the gas in traveling via these paths is in a direction away from the clearance space and substantially prevents any flow of the gas out of the arc-cleaning apparatus through the clearance space between the guide bearing 37 and the stock periphery. For a given gas flow rate, this effect can be strengthened by decreasing the size of the gap 97. If this gap is decreased enough, air will actually flow into the arc-cleaning apparatus about the stock periphery. We adjust this gap 97 so as to substantially prevent the outflow of gas, yet maintaining it large enough to prevent air from being drawn into the arc-cleaning assembly about the stock periphery.

It may be of interest to note that if the ends of the arc-cleaning assembly are left open, e.g., with the end plates 91 and 94 removed, there will be some flow by natural inspiration produced by the arc. This flow will generally follow the same paths as described hereinabove, i.e., it will be from the two outer ends of the arc-cleaning assembly through the exhaust passage 85, but the flow rate under these conditions will be much too low to prevent the above-described ringing and skipping from occurring. Relating such conditions to the curves depicted in FIG. 5, the flow rate accompanying natural inspiration will typically produce a force curve such as depicted at E. This curve E is considerably below the horizontal line B representing the minimum force to prevent ringing. In referring to natural inspiration, we intend to denote the flow rate through the arc-cleaning apparatus that would be produced by the arc without assistance from any source of super-atmospheric pressure and with free communication to atmosphere about the stock.

In operating our arc-cleaning apparatus, we first establish a flow rate through the apparatus that we know from past experience is sufficiently high to hold the arc in the stagnation region. It is only after this flow rate has been established that the arc is initiated. If the arc is initiated outside the stagnation region, the gas streams 82 and 83 quickly force it into the stagnation region. If, on the other hand, the arc alone had been relied upon to produce the gas flow, there would have been a particularly great tendency for ringing to have occurred in the initial stages of operation before the arc could draw even the above-described small flow of gas through the apparatus.

In the discussion up to this point, emphasis has been placed on the stagnation zone 80 in which the cathode terminal of the arc is captured. There are two other stagnation zones 100 and 102 that are of some significance. These stagnation zones are located at the corners of the anode sections 32a and 32b around which the gas streams 82 and 83 flow as they enter the exhaust passage 85. Each of these stagnation regions 100 and 102 extends about the entire circumference of the anode adjacent one of the corners. These stagnation regions 100 and 102 provide preferred zones for location of the anode terminal of the arc, and the anode terminal will remain in one of these annular stagnation regions as the arc revolves about the stock 10. Typically, the anode terminal will attach to the anode section 32a. Thus, the arc is firmly anchored against movement with the wire stock as a result of the captive status of its terminal regions within the stagnation zones 80 and 100 or 102.

In the illustrated embodiment, the arc-rotating coils 60 and 62 are connected in series with the anode 32, as was described hereinabove. This provides a relatively high inductance in series with the arc from which stored energy will be automatically released as needed to help sustain the arc in case of sudden increases in arc voltage, such as might result if the cathode terminal encounters an unusually heavy spot of scale on the wire stock 10. In effect, this inductance is responsible for an inertia effect that helps sustain the arc. Much of this desirable arc-sustaining effect can be lost if there is any substantial amount of capacitance located electrically between the inductance and the arc. We are able to hold this capacitance to an exceptionally low value because the lead 47 interconnecting the coil and the anode 32 can be very short and therefore devoid of significant capacitance. It is the close proximity of the coil and the anode that makes it possible to use such a short lead.

Each of the arc rotating coils 60 and 62 is preferably formed by winding heavy copper tubing into a series of concentric helices of successively larger diameter. The conductor 46 from the power source 40 is electrically connected to the first turn of coil 60 and the bridging conductor 43 is electrically connected to the last turn of coil 60. The bridging conductor 43 is connected at its other end to the first turn of coil 62, and the anode conductor 47 is electrically connected to the last turn of coil 62. All of the turns of each individual coil are electrically insulated from each other by suitable insulating means not shown so as to prevent any of the turns from being shortcircuited.

In a preferred embodiment of our invention, the gas that is supplied through the streams 82 and 83 is nitrogen. Argon and other chemically inert gases having a low thermal conductivity are also suitable but are generally not as desirable because of their higher cost. With argon, however, this higher cost can be offset to a large extent by the reduced electric power consumption resulting from the lower arc voltage occurring when the arc 49 burns in argon.

Tests have also been made with helium, hydrogen, steam, and air. As compared to the inert gases having low thermal conductivity, helium, hydrogen and steam have shown a considerably stronger tendency to permit ringing and skipping to occur. Air, as compared to inert low thermal conductivity gases, has shown a greater tendency to permit skipping and ringing to occur and is subject to the additional disadvantage that it tends to reoxidize the surface of the wire stock while the surface is still hot from the arc. If an inert gas such as nitrogen or argon is used in our device, the wire stock has cooled by the time it reenters the atmosphere to a sufficient extent that no objectionable oxidation occurs. A factor contributing to the desired cooling in our device is that the freshly-cleaned portion of the wire stock is exposed only to inert gas during its travel from the arcing region to the point at which it leaves the arc-cleaning device through downstream guide 37.

A suitable supply system for the nitrogen or other gas that is used is schematically shown in FIG. 6. This system comprises a source 110 of nitrogen under pressure, a regulating valve 112 in series with the source, and a flow meter 114 for maintaining the flow rate through the inlet nozzles 90 and 93 at a preselected level. Suitable supply lines 116 and 117 interconnect the flow meter and the nozzles. The exhaust from the arc-cleaning apparatus can be vented directly to atmosphere through the passage 85 described in connection with FIG. 2, but we prefer to reclaim the nitrogen therein and recirculate it through the streams 82 and 83. This is accomplished by providing a suitable manifold 118 in which the exhaust gases are collected upon leaving the exhaust passage 85 of FIG. 2 and a conduit 120 that leads from the manifold to the upstream side of the flow meter 114 via a heat exchanger 121 and a blower 122. The heat exchanger 121 cools the exhaust gases and collects the iron and scale particles in the exhaust gases. These particles are suitably removed from the heat exchanger at appropriate intervals. The blower 122 provides a positive pressure for recirculating the exhaust gas through conduit 120 and the supply system. Gas lost by leakage is made up from the pressure source 110, as controlled by the pressure sensitive regulating valve 112, which maintains a constant pressure on its downstream side.

For maintaining the coils 60 and 62 at a reasonably low temperature despite the passage of the arcing current therethrough, we circulate a coolant through the copper tubing that constitutes each coil. For the coil 60, the coolant enters the coil 60 through a section 130 and leaves the coil through a section 132. Preferably the coil 60 is connected in a closed fluid circuit (not shown) that includes a pump and a heat exchanger. The pump forces the coolant through the coil, and the heat exchanger extracts heat from the coolant before it reenters the coil. The other coil 62 is preferably connected in the same fluid circuit to enable the coolant flowing therethrough to be likewise cooled.

For maintaining the anode 32 at a reasonably low temperature despite the arcing that is occurring, we circulate coolant through a suitably shaped passageway extending internally of each of the anode sections. The passageway through anode section 32a is shown at 135 and that through anode section 32b is shown at 137. Preferably, each of these passageways extends over a helical path near the inner periphery of the anode. A suitable pump and heat exchanger of conventional design (not shown) are connected in fluid circuit with these passageways 135 and 137 to perform the necessary circulating and cooling functions with respect to the coolant.

Further cooling of the anode results from the streams 82 and 83 of inert gas flowing past the exposed surfaces of the anode. These streams of gas also help to scavenge the anode surface of scale deposits and to remove such deposits from the unit, thereby reducing the chances for mechanical difficulties or dielectric breakdowns resulting from these deposits.

Another advantage of our arrangement is that it does not produce circulating currents through other apparatus (not shown) which may be in electrical contact with the wire stock at points remote from the arc-cleaning apparatus. In this respect, note that substantially all current flowing from the cathode of the arc 49 back to the negative terminal 42 of the source must flow either through the grounded rollers 14 at one side of the arc-cleaning apparatus or the grounded rollers 16 at the other side. There are no significant current paths of comparably low resistance bypassing these rollers, for example, via the wire stock and other grounded apparatus contacting the wire stock at remote points. This, however, would not be the case if the connection to the negative terminal 41 was through only the rollers at one side of the arc-cleaning apparatus 30. For example, assume that only the rollers 16 were connected to the negative terminal 41. Some of the current leaving the cathode of the arc 49 would flow through this roller 16; but some would also flow through a path extending through the stock 10 in a direction upstream from the arc and then through grounded apparatus electrically connected to the wire stock then through ground to the conductor 39 via the ground connection at roller 16. Such circulating currents, though small, are undesirable because they can damage the bearings of the apparatus through which they pass.

In some prior devices, it has been necessary to direct most of the arcing current back to the negative terminal 41 via a path at only one side of the arc-cleaning device. In such devices, the location of this current path played an important role in providing whatever stabilization of the arc was available in the device. Our device, on the other hand, can stabilize the arc irrespective of whether the return current flows via one or both sides of the arc-cleaning apparatus. It is virtually insensitive to this current path location because the stabilization provided by the gas streams 82 and 83 completely predominates over the effect of the current path location. Hence, we are able to locate these current paths in such a position as to minimize the above described undesirable circulating currents through remote apparatus.

In certain instances, we may omit the rollers 14 and even 16 and use the rollers 22 or 24 of the mechanical scale breaker for providing a current path from wire stock 10. The intimate and extensive contact provided by these rollers 22 or 24 makes this an especially low resistance path. The insensitivity of our device to current path location provides us with the freedom to select such a current path location if it is desired.

In FIG. 7, there is shown a modification of the apparatus of FIG. 2. This modification of FIG. 7 is identical to that of FIG. 2 except that rings 150 and 152 of magnetic material have been incorporated into the anode sections 32a and 32b at their inner peripheries. The purpose of these rings is to reduce the reluctance of the portion of the magnetic circuit extending between the inner cylinders 70 and 73. This serves to reduce the amount of leakage flux that bypasses the arcing region via paths that extend radially between the inner and outer cylinders. The net result is more useful flux in the arcing region. It will be noted that these rings 150 and 152 terminate short of the surfaces at which arcing occurs. This relationship reduces the chance for flux bypassing the crucial arcing region.

Many of the above-described features of our invention have utility in an arc plasma generator as well as in arc cleaning apparatus. For example, in FIG. 8, there is schematically illustrated anode structure 32 and arc-rotating structure 60, 62, 66a, 66b, corresponding to that of FIG. 2, which is used for the anode and arc-rotating structure of a plasma generator. The cathode structure is also a metallic rod (158) that is driven through the anode 32 in a manner similar to that described for the arc cleaning apparatus, but this rod 158 is a clean rod and portions of it are repetitively driven through the anode bore. Preferably, as shown in FIG. 8, this rod 158 is of a closed-loop configuration and is driven about a closed path by suitable means such as motor driven rollers 160. Guide rollers 162 support the rod along other portions of its closed path.

Streams of gas indicated by the arrows 82 and 83 are directed along the rod from opposite ends of the combined anode and arc-rotating structure, and these streams are exhausted radially outward through an exhaust passage 85 extending between sections 32a and 32b of the anode, in the same manner as described in connection with FIGS. 1-7. These opposing streams 82 and 83 merge at the entrance to the exhaust passage, creating an annular stagnation region extending about the cathodic rod at this point. This stagnation region corresponds to that indicated at 80 in FIG. 4.

An arc is established between the anode and the cathode at the mouth of the exhaust passage 85 and the arc cathode is captured in the stagnation region 80. For the reasons pointed out hereinabove, the arc remains stabilized in this position despite the high speed passage of the cathodic rod through the arcing zone. The arc is rotated at high speed about the rod periphery by a magnetic field of the same configuration as described in connection with FIGS. 1-7 and developed by the same means 60, 62, 66a, 66b as described in connection with FIGS. 1-7.

The high speed motion of the rod 158 through the arcing region limits the time during which a given section of the rod is exposed to the arc and thus limits arc-erosion of the cathode to a permissibly low level. It is to be understood that the speed of rod motion in the plasma generator of FIG. 8 can be much higher than in the arc cleaning apparatus, since in the arc cleaning apparatus the speed was limited in order to allow time for the arc to effectively cover the rod surface. No such coverage is needed in a plasma generator. The reduced erosion that results from these high speeds prolongs the electrode life and permits the plasma generator to be operated for a longer time than would otherwise be the case. Also, the reduced erosion prevents the plasma from being significantly contaminated by cathode vapor, which is an important objective for certain plasma generator applications.

The high speed rotation of the arc about the rod periphery plays an important part in insuring that all of the gas passing about the rod periphery is exposed to the arc. This contributes to uniform heating of these gases.

Another factor contributing to uniform heating of the gases is the fact that the arc remains fixed in position, considered in a direction longitudinally of the rod. If, on the other hand, the cathode of the arc were permitted to skip about on the cathode, lengthening and shortening the arc in the process, there would be variations in the arc-energy that could seriously detract from the desired uniformity in heating of the gases.

To further reduce the amount of arc erosion and to limit the temperature rise of the rod, we prefer to provide a heat-exchanger 165 through which the rod is passed as it leaves the plasma generator. This heat exchanger serves to cool the rod as it passes therethrough and can be of any suitable design for accomplishing this purpose. Preferably, the heat exchanger effects cooling of the rod by means of a liquid that contacts the rod as it passes therethrough.

Although we have shown an arc generator in which the rod follows a rectilinear path in passing through the plasma generator, it is to be understood that this path could alternatively be of other shapes. For example, the rod could be of a circular configuration and be driven along a circular path. This would eliminate the need for flexing the rod about its rollers but would necessitate some slight changes in the shape of the anode and arc-rotating structure so as to provide it with a curved bore through which the circular shaped rod could pass.

While we have shown and described particular embodiments of our invention, it will be obvious to those skilled in the art that various changes and modifications may be made without departing from our invention in its broader aspects, and we, therefore, intend in the appended claims to cover all such changes and modifications as fall within the true spirit and scope of our invention.

What we claim as new and desire to secure by Letters Patent of the United States is:

1. In apparatus for cleaning the surface of elongated conductive stock by means of an electric arc, the combination of:
   (a) an annular anode having a bore through which said elongated stock is passed,
   (a′) means for connecting said anode to the positive terminal of a direct current source and for connecting said stock to the negative terminal of said source,
   (b) exhaust passage means communicating with said bore and leading radially outward therefrom,
   (c) the entrance to said exhaust passage means from said bore being located intermediate the longitudinally opposed ends of said anode,
   (d) the portions of said anode at opposite sides of said exhaust passage means being electrically connected together independently of said arc,
   (e) means for forcing a first stream of gas to flow longitudinally of said bore in one direction and then through said exhaust passage means and for concurrently forcing a second stream of gas to flow longitudinally of said bore in an opposite direction and then through said exhaust passage means,
   (f) said two streams merging at the entrance to said exhaust passage means to form an annular stagnation zone about the periphery of said stock adjacent said entrance,
   (g) means for establishing said arc between said anode and said stock with the cathode terminal of said arc located and maintained in said annular stagnation zone,
   (h) and magnetic means for rotating said arc about the periphery of said elongated stock as the stock passes through said anode.

2. The apparatus of claim 1 in combination with means for maintaining the flow rate through the gas stream flowing counter to the direction of stock movement materially above the flow rate that would result from natural inspiration by the arc, the flow rate that is maintained being high enough to hold the cathode terminal of said arc in said stagnation zone despite the passage of scaly stock of magnetic material through said anode bore at over 100 feet per minute.

3. In apparatus for cleaning the surface of elongated conductive stock by means of an electric arc, the combination of:
   (a) an annular anode having a bore through which said elongated stock is passed, (a') means for connecting said anode to the positive terminal of a direct current source and for connecting said stock to the negative terminal of said source, (b) exhaust passage means communicating with said bore and leading radially outward therefrom, (c) means for forcing a first stream of gas to flow longitudinally of said bore in one direction and then through said exhaust passage means and for concurrently forcing a second stream of gas to flow longitudinally of said bore in an opposite direction and then through said exhaust passage means, (d) said two streams merging at the entrance to said exhaust passage means to form an annular stagnation zone about the periphery of said stock adjacent said entrance, (e) means for establishing said arc between said anode and said stock with the cathode terminal of said arc located and maintained in said annular stagnation zone, (f) and magnetic means for rotating said arc about the periphery of said elongated stock as the stock passes through said anode, (g) and means independent of the arc for maintaining the flow rate through said streams high enough to hold the cathode terminal of said arc in said stagnation zone despite the passage of scaly stock of magnetic material through said apparatus at over 100 feet per minute.

4. The apparatus of claim 1 in combination with means independent of the arc for maintaining the flow rate through said streams high enough to substantially prevent ringing and skipping by the arc despite the passage of scaly stock of magnetic material through said apparatus at over 100 feet per minute.

5. The apparatus of claim 1 in which said magnetic means comprises means for producing a magnetic field that extends predominantly axially of said bore around said stock across the entrance to said exhaust passage means.

6. The apparatus of claim 1 in which said magnetic means comprises a coil connected in series with said anode and providing a high inductance in series with said arc that is capable of maintaining said arc burning despite sudden increases in arc voltage.

7. The apparatus of claim 1 in which a circuit element having a high inductance is connected in series with said anode, said inductance being sufficiently high to maintain said arc burning despite sudden increases in arc voltage.

8. In apparatus for cleaning the surface of elongated conductive stock by means of an electric arc, the combination of:

(a) an annular anode having a bore through which said elongated stock is passed, (a') means for connecting said anode to the positive terminal of a direct current source and for connecting said stock to the negative terminal of said source, (b) exhaust passage means communicating with said bore and leading radially outward therefrom, (c) the entrance to said exhaust passage means from said bore being located intermediate the longitudinally opposed ends of said anode, (d) the portions of said anode at opposite sides of said exhaust passage means being electrically connected together independently of said arc, (e) means for causing a stream of gas to flow longitudinally of said bore in a direction counter to the direction of stock motion and then through said exhaust passage means, (f) means for preventing any substantial portion of said stream of gas from continuing along said stock past said exhaust passage means, thereby producing an annular stagnation zone about the periphery of said stock adjacent the entrance to said exhaust passage means, (g) means for establishing said arc between said anode and said stock with the cathode terminal of said arc located in said annular stagnation region, (h) and magnetic means for rotating said arc about the periphery of said elongated stock as the stock passes through said anode.

9. The apparatus of claim 8 in combination with means independent of the arc for maintaining the flow rate through said stream high enough to hold the cathode terminal of said arc in said stagnation region despite the passage of scaly stock of magnetic material through said apparatus at over 100 feet per minute.

10. The apparatus of claim 8 in which:

(a) the gas used for said gas stream is a chemically inert gas having a low thermal conductivity, (b) the portions of the stock freshly cleaned by the arc are maintained in said gas stream until said freshly cleaned portions have cooled sufficiently to substantially prevent surface reoxidation upon reentry into the atmosphere.

11. In apparatus for cleaning the surface of the elongated conductive stock by means of an electric arc, the combination of:

(a) a tubular assembly having a bore through which said stock is moved, means for establishing an arc within said bore that cleans said stock as the stock moves therethrough, said bore being substantially larger than said stock so that a tubular passage extending longitudinally of the stock is present about the stock periphery, (b) exhaust passage means communicating with said bore and leading radially outward therefrom, (c) means for forcing an arc-stabilizing stream of inert gas to flow longitudinally of said tubular assembly about the periphery of said stock and then through said exhaust passage means, (d) a tubular guide at one end of said tubular assembly surrounding the stock with some clearance and providing guidance for the stock as it passes through the tubular assembly, (e) support means disposed radially outwardly of said guide for supporting said guide on said tubular assembly, said support means being constructed to substantially prevent atmospheric air from entering said tubular passage by paths located radially outwardly of said guide, (f) means for introducing said gas stream into said tubular passage via a path that is located adjacent said guide and radially outward therefrom, said path being disposed at an acute angle relative to said stock that is so small that substantially none of the gas in said stream is diverted through the clearance space between said guide and the periphery of said wire stock.

12. Arc-utilization apparatus comprising:

(a) a rod that serves as the cathode for an electric arc, (b) an annular anode having a bore through which said rod is passed in a direction longitudinally of the rod, (b') means for connecting said anode to the positive terminal of a direct current source and for connecting said rod to the negative terminal of said source, (c) exhaust passage means communicating with said bore and leading radially outwardly therefrom, (d) the entrance to said exhaust passage means from said bore being located intermediate the longitudinally opposed ends of said anode, (e) the portions of said anode at opposite sides of said exhaust passage means being electrically connected together independently of said arc, (f) means for causing a stream of gas to flow longitudinally of said bore in a direction counter to the direction of rod motion and then through said exhaust passage means, (g) means for preventing any substantial portion of said stream of gas from continuing along said rod past said exhaust passage means, thereby producing an annular stagnation zone about the periphery of said rod adjacent the entrance to said exhaust passage means, (h) means for establishing said arc between said anode and said rod with the cathode terminal of said arc located and maintained in said annular stagnation region, (i) and magnetic means for rotating said arc about the periphery of said rod as the rod passes through said anode.

13. The apparatus of claim 12 in which longitudinally displaced sections of said rod are driven along a closed path so that said sections pass repetitively through the region of said arc.

14. The apparatus of claim 12 in which longitudinally displaced sections of said rod are driven along a closed path so that said sections pass repetitively through the region of said arc, and heat exchange means for cooling said longitudinally displaced sections of said rod between their respective exposures to said arc.

15. Arc-utilization apparatus comprising:
(a) a rod that serves as the cathode for an electric arc,
(b) an annular anode having a bore through which said rod is passed in a direction longitudinally of the rod,
(c) exhaust passage means communicating with said bore and leading radially outwardly therefrom,
(d) means independent of the arc for forcing a stream of gas to flow longitudinally of said bore in a direction counter to the direction of rod motion and then through said exhaust passage means,
(e) means for preventing any substantial portion of said stream of gas from continuing along said rod past said exhaust passage means, thereby producing an annular stagnation zone about the periphery of said rod adjacent the entrance to said exhaust passage means,
(f) means for establishing said arc between said anode and said rod with the cathode terminal of said arc located and maintained in said annular stagnation region,
(g) magnetic means for rotating said arc about the periphery of said rod as the rod passes through said anode,
(h) and means for maintaining the flow rate through said stream high enough to hold the cathode terminal of said arc in said stagnation zone despite the passage of a scaly rod of magnetic material through said apparatus at over 100 feet per minute.

16. In apparatus for cleaning the surface of elongated conductive stock by means of an electric arc, the combination of:
(a) an annular anode having a bore through which said elongated stock is passed,
(b) exhaust passage means communicating with said bore and leading radially outward therefrom,
(c) the entrance to said exhaust passage means from said bore being located intermediate the longitudinally opposed ends of said anode,
(d) the portions of said anode at opposite sides of said exhaust passage means being electrically connected together independently of said arc,
(e) means for forcing a first stream of gas to flow longitudinally of said bore in one direction and then through said exhaust passage means and for concurrently forcing a second stream of gas to flow longitudinally of said bore in an opposite direction and then through said exhaust passage means,
(f) said two streams merging at the entrance to said exhaust passage means to form an annular stagnation zone about the periphery of said stock adjacent said entrance,
(g) means for establishing said arc between said anode and said stock with the cathode terminal of said arc located and maintained in said annular stagnation zone,
(h) and magnetic means for rotating said arc about the periphery of said elongated stock as the stock passes through said anode,
(i) said magnetic means comprising:
  (i) means for producing a magnetic field that extends axially of said bore across the entrance to said exhaust passage means,
  (ii) and means defining a magnetic circuit for said magnetic field comprising generally annular members of magnetic material surrounding the axis of said bore and located at positions spaced apart longitudinally of said bore on opposite sides of said exhaust passage means,
  (iii) said magnetic circuit being so constructed that said annular members are in series in said magnetic circuit and the space between said annular members constitutes an annular gap in series with said annular members across which the magnetic field extends axially of said bore.

17. The apparatus of claim 16 in which said anode includes rings of magnetic material at its inner periphery located on axially-opposed sides of said exhaust passage means for increasing the flux concentration in said stagnation region.

18. In apparatus for cleaning the surface of elongated conductive stock by means of an electric arc, the combination of:
(a) an annular anode having a bore through which said elongated stock is passed,
(b) exhaust passage means communicating with said bore and leading radially outward therefrom,
(c) the entrance to said exhaust passage means from said bore being located intermediate the longitudinally opposed ends of said anode,
(d) the portions of said anode at opposite sides of said exhaust passage means being electrically connected together independently of said arc,
(e) means for forcing a first stream of gas to flow longitudinally of bore in one direction and then through said exhaust passage means and for concurrently forcing a second stream of gas to flow longitudinally of said bore in an opposite direction and then through said exhaust passage means,
(f) said two streams merging at the entrance to said exhaust passage means to form an annular stagnation zone about the periphery of said stock adjacent said entrance,
(g) means for establishing said arc between said anode and said stock with the cathode terminal of said arc located and maintained in said annular stagnation zone,
(h) and magnetic means for rotating said arc about the periphery of said elongated stock as the stock passes through said anode,
(i) said magnetic means comprising coil structure surrounding the axis of said bore and located on opposite sides of said exhaust passage means, two axially spaced tubes of magnetic material located radially inwardly of said coil structure to define a low reluctance path for magnetic flux passage through the window of said coil structure when said coil structure is energized, said tubes being spaced apart axially of said bore on opposite sides of said exhaust passage means so as to define an annular gap therebetween across which magnetic lines of force extend axially of the bore of said anode and transversely of said exhaust passage means.

19. In apparatus for cleaning the surface of elongated conductive stock by means of an electric arc, the combination of:
(a) an annular anode having a bore through which said elongated stock is passed, (b) exhaust passage means communicating with said bore and leading radially outward therefrom, (c) the entrance to said exhaust passage means from said bore being located intermediate the longitudinally opposed ends of said anode, (d) the portions of said anode at opposite sides of said exhaust passage means being electrically connected together independently of said arc, (e) means for forcing a first stream of gas to flow longitudinally of said bore in one direction and then through said exhaust passage means and for concurrently forcing a second stream of gas to flow longitudinally of said bore in an opposite direction and then through said exhaust passage means, (f) said two streams merging at the entrance to said exhaust passage means to form an annular stagnation zone about the periphery of said stock adjacent said entrance, (g) means for establishing said arc between said anode and said stock with the cathode terminal of said arc located and maintained in said annular stagnation zone, (h) and magnetic means for rotating said arc about the periphery of said elongated stock as the stock passes through said anode, (i) said magnetic means comprising means for producing a magnetic field that extends axially of said bore across the entrance to said exhaust passage means, said magnetic means comprising coil structure surrounding the longitudinal axis of said anode, two axially spaced tubes of magnetic material disposed within said coil structure about the longitudinal axis of said anode and defining series-related sections of a magnetic circuit for flux developed by energization of said coil structure, said tubes being located on opposite sides of said exhaust passage means so that a gap is present between said tubes across which flux extends axially of said anode and transversely of said exhaust passage means.

20. In apparatus for cleaning the surface of elongated conductive stock by means of an electric arc, the combination of:

(a) an annular anode having a bore through which said elongated stock is passed, (b) exhaust passage means communicating with said bore and leading radially outward therefrom, (c) the entrance to said exhaust passage means from said bore being located intermediate the longitudinally opposed ends of said anode, (d) the portions of said anode at opposite sides of said exhaust passage means being electrically connected together independently of said arc, (e) means for forcing a first stream of gas to flow longitudinally of said bore in one direction and then through said exhaust passage means and for concurrently forcing a second stream of gas to flow longitudinally of said bore in an opposite direction and then through said exhaust passage means, (f) said two streams merging at the entrance to said exhaust passage means to form an annular stagnation zone about the periphery of said stock adjacent said entrance, (g) means for establishing said arc between said anode and said stock with the cathode terminal of said arc located and maintained in said annular stagnation zone, (h) and magnetic means for rotating said arc about the periphery of said elongated stock as the stock passes through said anode, (i) a unidirectional current source for supplying current to said arc, said source having a positive terminal and a negative terminal, means for electrically connecting said positive terminal to said anode, and means for electrically connecting said negative terminal to said wire stock at points on opposite sides of said arc-cleaning apparatus, the connection between said negative terminal and the two points on said wire stock on opposite sides of said arc-cleaning apparatus providing two separate parallel paths other than ground for current flowing between the cathode terminal of the arc and the negative terminal of said source.

21. In apparatus for cleaning the surface of elongated conductive stock by means of an electric arc, the combination of:

(a) an annular anode having a bore through which said elongated stock is passed, (b) exhaust passage means communicating with said bore and leading radially outward therefrom, (c) the entrance to said exhaust passage means from said bore being located intermediate the longitudinally opposed ends of said anode, (d) the portions of said anode at opposite sides of said exhaust passage means being electrically connected together independently of said arc, (e) means for forcing a first stream of gas to flow longitudinally of said bore in one direction and then through said exhaust passage means and for concurrently forcing a second stream of gas to flow longitudinally of said bore in an opposite direction and then through said exhaust passage means, (f) said two streams merging at the entrance to said exhaust passage means to form an annular stagnation zone about the periphery of said stock adjacent said entrance, (g) means for establishing said arc between said anode and said stock with the cathode terminal of said arc located and maintained in said annular stagnation zone, (h) and magnetic means for rotating said arc about the periphery of said elongated stock as the stock passes through said anode, (i) means for recirculating the exhaust gases through said apparatus via said gas streams, (j) means for cooling said exhaust gases before reintroduction into said gas streams, and (k) means for removing scale particles from said exhaust gases before reintroduction into said gas streams.

References Cited by the Examiner

UNITED STATES PATENTS 2,944,140  7/60  Giannini et al.
3,146,336  8/64  Whitacre _____ 219—121

RICHARD M. WOOD, *Primary Examiner.*

JOSEPH V. TRUHE, *Examiner.*